(12) United States Patent
Moore

(10) Patent No.: US 8,749,682 B2
(45) Date of Patent: Jun. 10, 2014

(54) ANALOG TO DIGITAL CONVERSION IN IMAGE SENSORS

(75) Inventor: John Kevin Moore, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 380 days.

(21) Appl. No.: 13/081,678

(22) Filed: Apr. 7, 2011

(65) Prior Publication Data

US 2011/0249162 A1  Oct. 13, 2011

(30) Foreign Application Priority Data

Apr. 13, 2010 (GB) .................................. 1006088.7

(51) Int. Cl.
*H04N 3/14* (2006.01)
*H04N 5/335* (2011.01)

(52) U.S. Cl.
USPC ............................ 348/308; 341/155; 341/169

(58) Field of Classification Search
USPC .................................. 348/308; 341/155, 169
See application file for complete search history.

(56) References Cited

U.S. PATENT DOCUMENTS

| | | | |
|---|---|---|---|
| 2004/0227831 A1* | 11/2004 | Storm et al. .................. | 348/294 |
| 2005/0104983 A1* | 5/2005 | Raynor ......................... | 348/294 |
| 2008/0192126 A1* | 8/2008 | Purcell et al. ............... | 348/222.1 |
| 2009/0066826 A1* | 3/2009 | Gelfand ........................ | 348/308 |
| 2009/0261862 A1* | 10/2009 | Nguyen et al. ................. | 327/73 |
| 2012/0229169 A1* | 9/2012 | Nguyen et al. ................. | 327/73 |

FOREIGN PATENT DOCUMENTS

| | | |
|---|---|---|
| EP | 1475955 A1 | 11/2004 |
| EP | 1956715 A1 | 8/2008 |

OTHER PUBLICATIONS

UK Intellectual Property Office Search Report dated Jul. 9, 2010 for GB1006088.7 (1 page).

* cited by examiner

*Primary Examiner* — Antoinette Spinks
(74) *Attorney, Agent, or Firm* — Gardere Wynne Sewell LLP

(57) ABSTRACT

An image sensor has a pixel array and an input circuit. The input circuit includes a first input, a second input and two coupling capacitors. The first input receives an analog signal from a pixel of the pixel array which has a first level during a first calibration period and a second level during a second read period. The second input receives a reference ramp signal. A comparator circuit compares the ramp signal and the analog signal. The analog signal and the ramp signal are constantly read onto the coupling capacitors during both the first calibration period and the second read period. The ramp circuit begins providing the ramp signal during the second read period so as to determine the change in magnitude of the analog signal between the first calibration period and the second read period, the ramp circuit also begins providing the ramp signal during the first calibration period so as to compensate for any delay in the ramp circuit providing the ramp signal during the second read period.

24 Claims, 5 Drawing Sheets

_US 8,749,682 B2_

ANALOG TO DIGITAL CONVERSION IN IMAGE SENSORS

PRIORITY CLAIM

This application claims priority from Great Britain Application No. 1006088.7 filed Apr. 13, 2010, the disclosure of which is hereby incorporated by reference.

TECHNICAL FIELD

This invention relates to analog-to-digital conversion (ADC) in an image sensor.

BACKGROUND

In common forms of an image sensor, a two-dimensional array of pixels is read out row by row, the pixels of each column sharing column readout circuitry which commonly comprises correlated double sampling and ADC.

In European Patent Application EP1956715A, the disclosure of which is hereby incorporated by reference, there is disclosed an ADC arrangement for an image sensor, one embodiment of which is shown in FIG. 1 of the present application, and described later.

Although this prior arrangement provides advantages over the prior art, it has been found to have some deficiencies when applied to large arrays and/or high speeds. This is because the ramping signal used in the analog to digital conversion of the pixel level suffers from a slight delay before it actually begins ramping. The delay affects column capacitors differently across the x-direction of the array, causing an effect in the resulting image sometimes referred to as "x-droop".

There is a need in the art to address this issue.

SUMMARY

In an embodiment, an image sensor has a pixel array and comprises: an input circuit comprising a first input for receiving an analog signal from a pixel of said pixel array, the signal varying during a pixel readout period and having a first level during a first calibration period and a second level during a second read period, a second input for receiving a reference signal from a time varying reference circuit, and two coupling capacitors; and a comparator circuit for comparing the reference signal and the analog signal, wherein the image sensor is operable such that the analog signal from the pixel and the signal from the time variant reference circuit are constantly read onto respective ones of said two coupling capacitors during both the first calibration period and the second read period; and wherein said time variant reference circuit is arranged to begin providing a ramping signal during said second read period for determining the change in magnitude of said analog signal between said first calibration period and said second read period, said time variant reference circuit also being arranged to begin providing said ramping signal during said first calibration period so as to compensate for any delay in said reference circuit providing said ramping signal during said second read period.

BRIEF DESCRIPTION OF THE DRAWINGS

Embodiments of the invention will now be described, by way of example only, by reference to the accompanying drawings, in which.

DETAILED DESCRIPTION OF THE DRAWINGS

Figure 1:
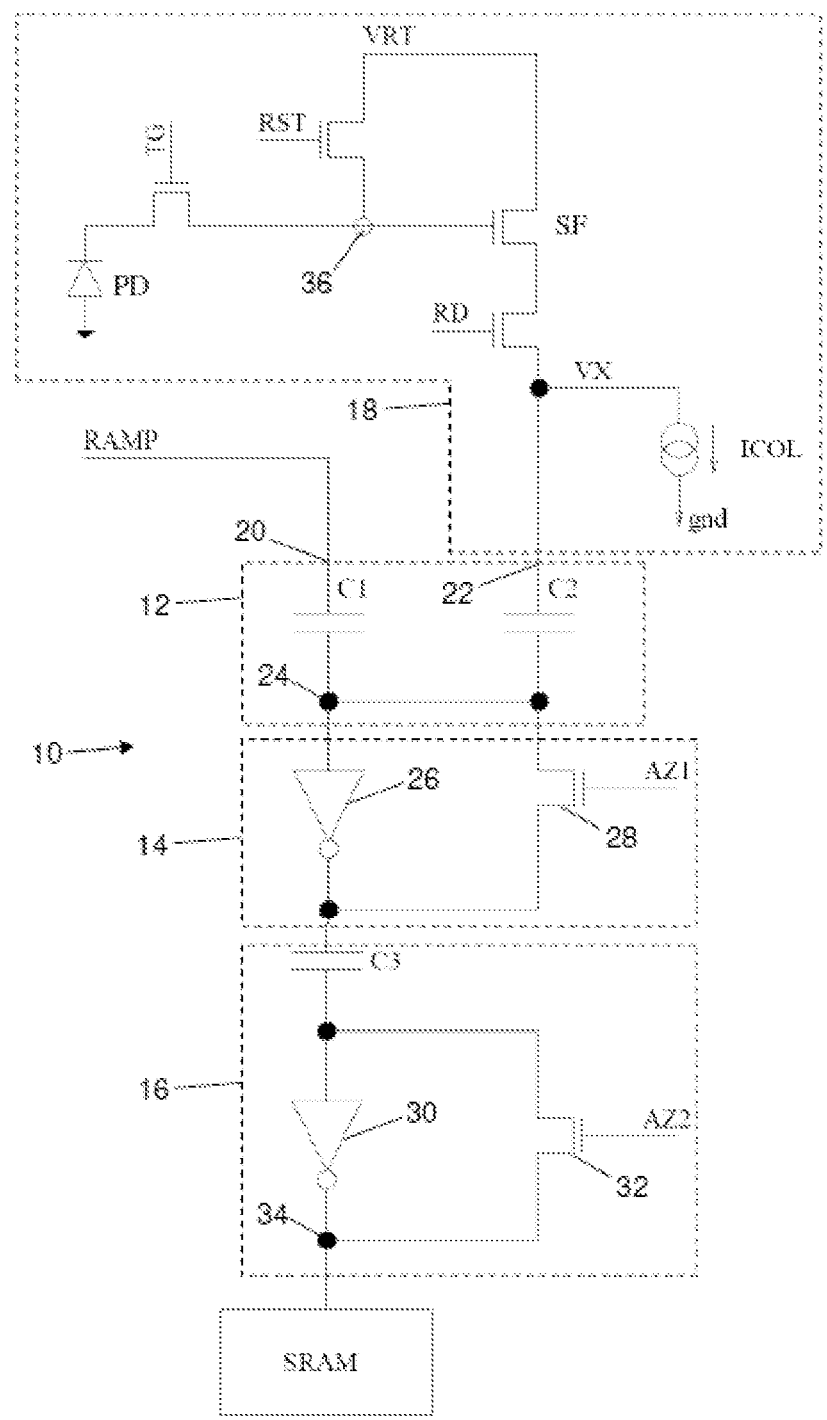
FIG. 1 is a schematic diagram of an embodiment of an ADC circuit as also described in patent application EP1956715A.

European Patent Application EP1956715A discloses an ADC arrangement for an image sensor, one embodiment of which is shown in FIG. 1. The structure and operation of this arrangement will be briefly described with reference to FIG. 1.

An analog to digital converter ADC 10 comprises an input circuit 12 and a comparator, the comparator comprising an inverter circuit 14 and an output circuit 16. The input 22 to the input circuit 12 is from the column output line of a pixel array, one pixel 18 being shown by way of example.

The input circuit 12 comprises, in this example, a first capacitor C1 connected to a first input 20 and a second capacitor C2 connected to a second input 22. The first input 20 is connected to a ramp generator RAMP, which generates an appropriate time varying reference signal when required by the control means, the value of the time varying reference signal being known by the control means at any given time. The second input 22 is connected to the output of the pixel 18. The first and second capacitors C1, C2 are also connected to the input circuit's output node 24. The input circuit 12 allows correlated double sampling by autozeroing the comparator when input 22 references the black pixel value.

The inverter circuit 14, which could be a CMOS, NMOS or PMOS type inverter, comprises a first inverter 26 and, on a feedback loop from the output of the first inverter 26, a first transistor 28. The first transistor 28, in this instance, operates as a switch and is activated by an autozero signal AZ1 from the control means.

The output circuit 16 comprises a third capacitor C3, connected to the output of the inverter circuit 14, a second inverter 30 and, on a feedback loop from the output of the second inverter 30, a second transistor 32. The second transistor 32, in this instance, operates as a switch and is activated by an autozero signal AZ2 from the control means. The output circuit 16 stores the value of the pixel 18 in a memory SRAM.

The pixel 18 comprises a photodiode PD, a transfer gate transistor TG, a reset transistor RST, a source follower transistor SF and a read transistor RD. The operation of the pixel transistors are controlled by the control means. It should be noted that the current source ICOL is strictly part of the column, not internal to the pixel.

The comparator (inverter circuit 14 and an output circuit 16) can be described as a summing comparator in that it adds the two input values RAMP and VX. If RAMP+VX is greater than zero, the output of the comparator goes high, and if RAMP+VX is less than zero, the output of the comparator goes low, where zero for RAMP is the value of RAMP when VX(black) is measured and zero for VX is VX(black).

The arrangement of FIG. 1 was devised to mitigate sample and hold noise caused by sample and hold capacitors of a correlated double sample circuit, more commonly known as kT/C noise, due to its derivation (k is a constant, T is temperature and C is capacitance). The result of this is that to reduce this noise by two, capacitor size is required to increase by four. As such, size or noise limits are placed on the design of the image sensor. In the arrangement of FIG. 1, the kT/C noise of the sample capacitors, C1 and C2, is mitigated by removing the requirement to hold. That is, the capacitors C1 and C2 are continuously connected to the ramp generator and VX respectively and, as such, there is a less kT/C noise generated than if a hold operation was performed. This allows C1 and C2 to be reduced in size.

Figure 2:
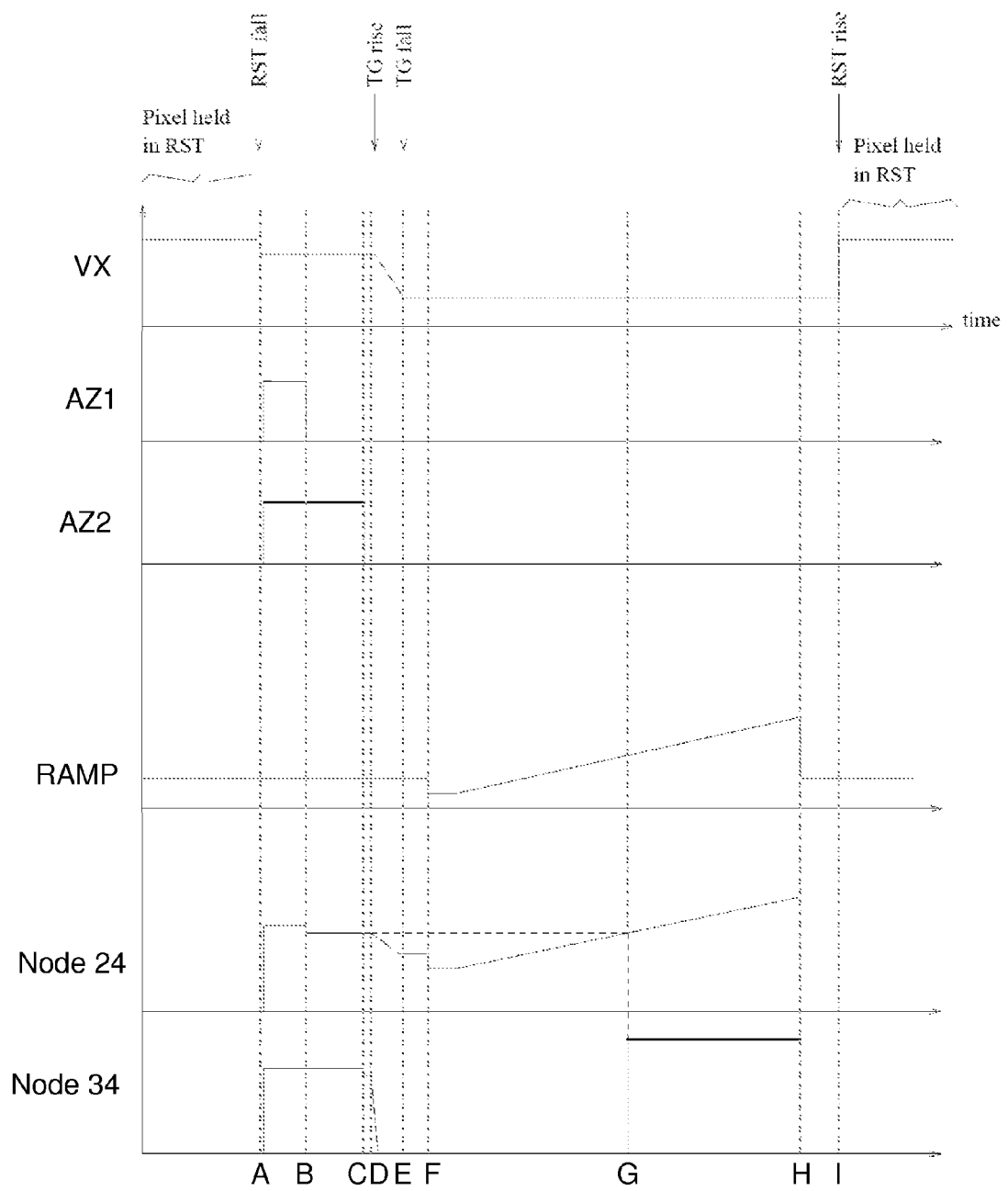
FIG. 2 is a timing diagram showing the operation of the circuit of FIG. 1.

Referring to FIG. 2 as well as FIG. 1, in operation and during a read out cycle of a pixel, the control means firstly turns on read transistor RD (not shown in the timing diagram of FIG. 2), to indicate that this pixel should be read out. Reset transistor RST is then turned on in a reset phase for a period up to timing point A in FIG. 2. The reset voltage of the pixel is shown at VX in FIG. 2.

At point A, the control means then applies signal AZ1 to transistor 28 and AZ2 to transistor 32, as well as turning off reset transistor RST. In taking the pixel 18 out of reset, the output node VX drops in voltage according to the kT/C noise and charge injection of the reset transistor RST (the pixel reset noise). This gives a value for VX(black), the value of the pixel 18 output if no light is detected, taking into account pixel reset noise. As transistor 28 and transistor 32 have been turned on, the input offset of the inverter circuit 14 is sampled onto capacitors C1 and C2 and the input offset of the output circuit 16 is sampled onto capacitor C3. In addition, capacitor C2 will also have sampled VX(black) on the opposite side to which the input offset of the inverter circuit 14 is sampled. Also at this point, the RAMP voltage is set to a value higher than zero in order to remove RAMP signal non-linearities when it starts to ramp the voltage.

At point B the control means turns off transistor 28 by removing the signal AZ1. As a result, the kT/C noise from the inverter circuit 14 is sampled onto capacitors C1 and C2, as represented by the small drop in voltage at node 24. As signal AZ2 is still high (switch on), this kT/C noise is sampled onto capacitor C3 of the output circuit. That is, the input offset of the output circuit 16 (the switching point) is sampled onto one side of capacitor C3 and the kT/C noise of the inverter circuit 14 onto the other side.

At point C the control means turns off transistor 32 by removing signal AZ2. As a result, the kT/C noise from the output circuit 16 and charge injection of transistor 32 is sampled onto capacitor C3, as represented by the small drop in voltage at node 34.

At point D the transfer gate transistor TG is turned on by the control means, starting a sensing phase and allowing the impinging light onto the photodiode to effect the voltage at the sense node 36 and, as a result, causing a decrease in voltage at node VX. The transfer gate transistor TG is then turned off again by the control means at point E. The change in voltage during this period is related to the amount of light which has been received by the pixel 18. The drop in voltage at node VX is reflected proportionally at node 24 and is equivalent to VX(signal), which is the value of the pixel 18 after integration.

At point F the ramp generator signal RAMP is started by the control means. The ramp generator voltage is reduced to begin with so that, if there is only a small voltage change at node VX, it can still be detected. The ramp generator then increases the ramp voltage RAMP over the range of detectable voltage levels. When the voltage at node 24 returns to its "black level", the voltage at node 34 goes high, shown at point G in FIG. 2. The digital word representing that point is then stored in the memory SRAM by the control means, as the high at node 34 indicates that the level of signal RAMP corresponds to VX(black)-VX(signal) and the level of signal RAMP is known by the control means.

Once the ramp signal RAMP has reached the highest voltage, shown at point H, the ramp signal RAMP is reset to its nominal voltage. The control means then resets the pixel by turning the reset transistor RST on and the process can then be repeated, as required.

Figure 3:
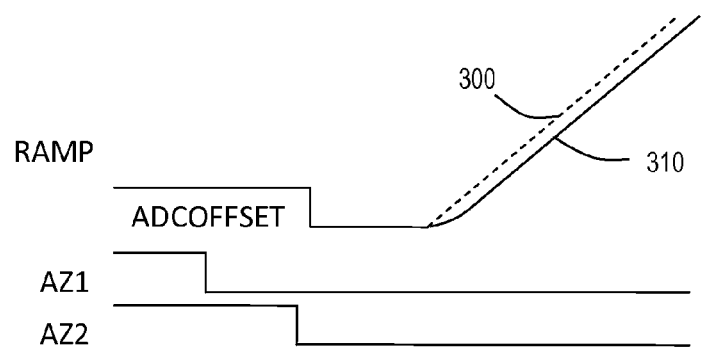
FIG. 3 is a graph illustrating the problem of ramp delay.

FIG. 3 illustrates a drawback with the above arrangement. Due to the parasitic RC network across the comparator array, there is a delay in the time between the DAC being set to ramp and the input signal of each ADC actually ramping. It shows a dotted ideal ramp 300 and the actual ramp signal 310 that would be received at the ADC input. The delay between ideal and actual ramps is clearly visible. Because of this static/transient nature of the DAC ramp, there arises a discrepancy between black and signal values when a continuous time comparator is deployed.

Figure 4:
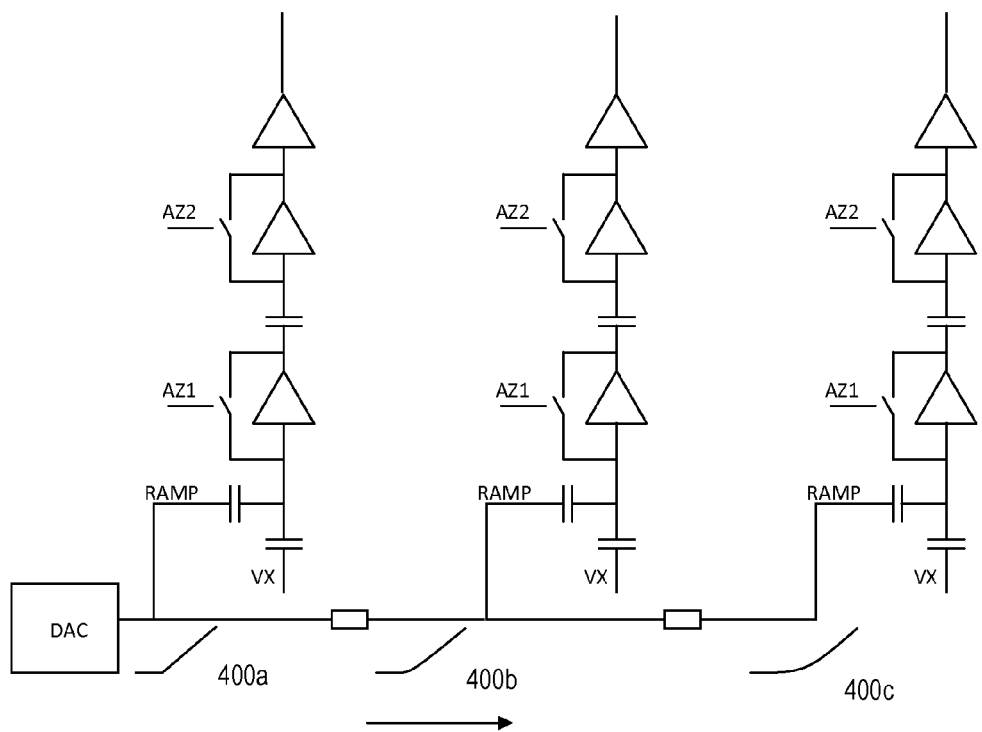
FIG. 4 shows part of an array with ramp traces further illustrating the problem of ramp delay.

FIG. 4 illustrates how this delay affects column capacitors differently across the x-direction of the array. This causes an effect in the resulting image sometimes referred to as "x-droop". It can be seen by the ramp signal traces 400a, 400b and 400c that the ramp becomes increasingly delayed the further along the x-direction it travels.

There is little that can be done to actually prevent this delay. However as mentioned previously, for the purposes of the first inverter 26, zero for the ramp signal RAMP is the value of RAMP when VX(black) is measured, and zero for VX is VX(black). Consequently the inventor has determined that the inverter can be "taught" this delay, by ramping the ramp signal RAMP during the transition of both the AZ1 and AZ2 signals, instead of simply applying a static offset.

Figure 5:
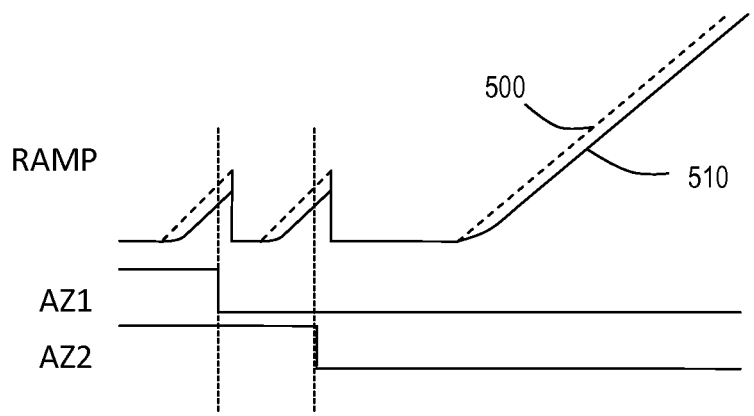
FIG. 5 is a graph illustrating the effect obtained by an embodiment of the invention.

FIG. 5 illustrates the effect of this method. As can be seen the ramp signal is being ramped when both AZ1 and AZ2 go low, in each case the ramping beginning at the same time before each transition. Again there are two traces shown, the dotted "ideal" trace 500 and the actual trace 510, the latter showing the same delay as in FIG. 3. However, this same delay is also present during the transitions of AZ1 and AZ2, meaning that the same voltage drop from ideal, at any particular time during the main ramping (when the pixel voltage/light level is being measured) has been mirrored by an equal drop at the input during sampling of the black level/noise. The fact that the delay increases across the array is not important as this effect will be the same for the ramp signal applied during auto zero operation and during light level measurement. Therefore, this effect always cancels out.

Figure 6:
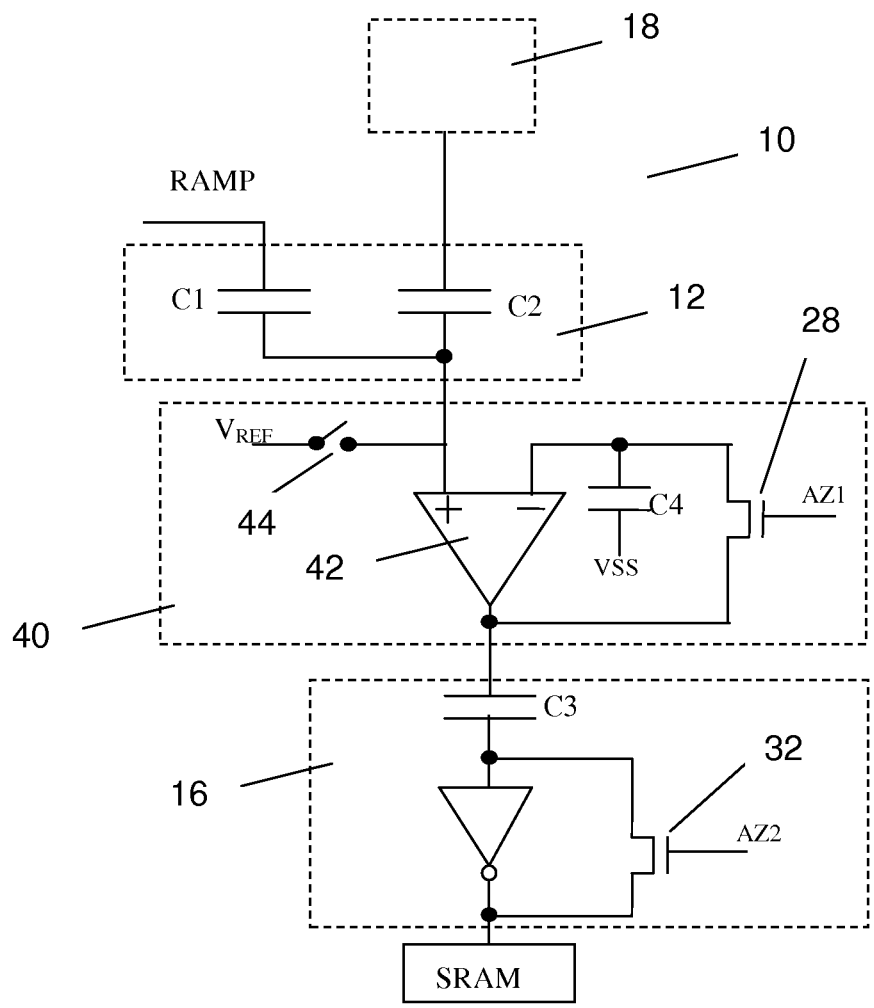
FIG. 6 is a circuit diagram of an alternative embodiment to the circuit of FIG. 1, having a differential input.

FIG. 6 shows an example where the input node 24 of FIG. 1 has been replaced by a differential input as disclosed in EP2104234A, the disclosure of which is hereby incorporated by reference. In this example, in which the pixel 18 has been omitted for simplicity, the inverter circuit 14 is replaced by a circuit 40 which comprises a differential amplifier 42, which will typically be a long tail pair, receiving the output of capacitors C1 and C2 at one input terminal. The differential amplifier is autobiased by a reference voltage Vref. In order to eliminate line noise artifacts, which would be introduced by a noisy reference voltage, the reference voltage is sampled and learned during autozeroing of the pixel and comparator; this is accomplished by a switch 44 (which will typically be a transistor) closing to sample Vref onto a capacitor C4.

The situation when black level signal VX(black) is being output from the pixel 18 is as follows. Reference signal $V_{REF}$ has pre-charged the non-inverting input of differential amplifier, such that when signal AZ1 is high and switch 28 is closed, the input offset of differential amplifier 42 is stored on capacitor C4. When signal AZ1 goes low and switch 28 opens, there will be charge injection and kT/C noise sampled on capacitor C4. This will cause the output of the differential amplifier to rise slightly. This rise is stored across capacitor C3. Signal AZ2 then goes low, switch 32 is opened and the circuit 16 operates as described in relation to FIG. 1.

The use of a differential amplifier as the first stage makes the output circuit more resistant to ground bounce, leading to a reduction in x-droop. This is because the input is now compared to a fixed reference signal and not ground.

Figure 7A:
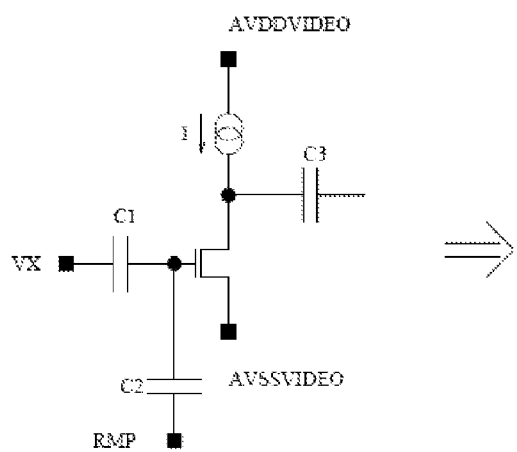
FIGS. 7a and 7b show a modified front-end circuit.
Figure 7B:
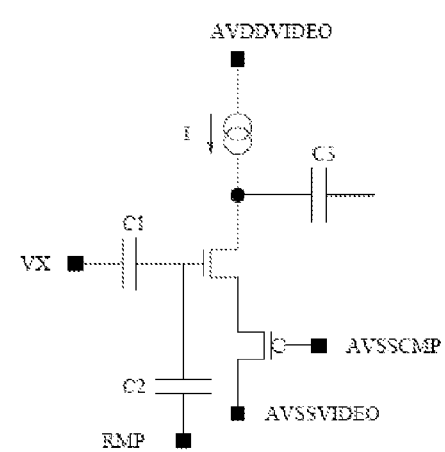

FIG. 7 shows a modified front-end circuit (FIG. 7b) of a further embodiment where the true differential front end circuit 40 of FIG. 6 is replaced by a pseudo-differential inverter (FIG. 7a is the front end of FIG. 1, in component form, for comparison). One input is connected to the input capacitors C1 and C2 and the other to a ground plane carrying no current (AVSSCMP). This makes the comparator more resistant to the ground plane carrying the current (AVSSVIDEO), as the input is now referenced to a more stable reference. This leads to an improved rejection to ground, hence less x-droop The above examples are provided for illustration only and other embodiments and variations can be envisaged without departing from the spirit and scope of the invention.

What is claimed is:

1. An image sensor having a pixel array and comprising:
   an input circuit comprising a first input configured to receive an analog signal from a pixel of said pixel array, the signal varying during a pixel readout period and having a first level during a first calibration period and a second level during a second read period, the input circuit further comprising a second input configured to receive a reference signal from a time varying reference circuit;
   two coupling capacitors;
   a comparator circuit configured to compare the reference signal and the analog signal; and
   an auto-zeroing circuit coupled across the comparator circuit,
   wherein the image sensor is operable such that the analog signal from the pixel and the reference signal from the time-varying reference circuit are constantly read onto respective ones of said two coupling capacitors during both the first calibration period and the second read period; and
   wherein said time-varying reference circuit is arranged to begin providing a ramping of said reference signal during said second read period and determine a change in magnitude of said analog signal between said first calibration period and said second read period, said time-varying reference circuit also arranged to provide said ramping of said reference signal during said first calibration period when the auto-zeroing circuit for the comparator circuit is actuated so as to compensate for any delay in onset of said ramping during said second read period.

2. The image sensor as claimed in claim 1, wherein said comparator circuit is operable to compare a sum of the reference signal from the time varying reference circuit and the analog signal to a fixed reference, the image sensor being operable such that the effect of said delay in the ramping onset is similar when sampling said first level than when determining said second level.

3. The image sensor as claimed in claim 1, wherein said comparator circuit comprises at least first and second inverter circuits coupled in series and wherein the auto-zeroing circuit comprises a first auto-zeroing circuit coupled across the first inverter circuit and a second auto-zeroing circuit coupled across the second inverter circuit, said time-varying reference circuit further arranged to provide said ramping of said reference signal during said first calibration period when both the first and second auto-zeroing circuits are actuated, said image sensor being operable such that during said first calibration period said first and second auto-zeroing circuits are deactuated sequentially, and such that said time varying reference circuit provides said ramping in the reference signal at the same time before each disconnection.

4. The image sensor as claimed in claim 3, wherein the comparator circuit further comprises an output capacitor.

5. The image sensor as claimed in claim 4, further operable such that said sequential disconnection of the first and second feedback loops allows for the sampling of offset voltages resultant from thermal noise from the pixel and comparator circuit such that the analog signal can be appropriately corrected.

6. The image sensor as claimed in claim 5, wherein said sequential deactuation of the first and second auto-zeroing circuits results in an input offset of said inverter circuit being sampled onto a first plate of the output capacitor and thermal noise from the comparator circuit being sampled onto a second plate of said output capacitor.

7. The image sensor as claimed in claim 6, wherein said deactuation of the second auto-zeroing circuit results in thermal noise from the inverter circuit being sampled onto the output capacitor.

8. The image sensor as claimed in claim 1, wherein the comparator circuit comprises a first differential input for said combination of the analog signal and the reference signal, said first differential input being biased by a fixed reference signal.

9. The image sensor as claimed in claim 8, wherein the comparator circuit comprises a second differential input, and a switching circuit configured to selectively connect an output of the comparator circuit to the second differential input.

10. The image sensor as claimed in claim 9, further comprising a capacitor coupled between the second differential input and a reference voltage node.

11. The image sensor as claimed in claim 8, further comprising a switching circuit configured to selectively apply the biasing fixed reference signal to said first differential input.

12. A device comprising an image sensor, wherein the image sensor has a pixel array and comprises:
    an input circuit comprising a first input configured to receive an analog signal from a pixel of said pixel array, the signal varying during a pixel readout period and having a first level during a first calibration period and a second level during a second read period, the input circuit further comprising a second input configured to receive a reference signal from a time varying reference circuit;
    two coupling capacitors;
    a comparator circuit configured to compare the reference signal and the analog signal; and
    an auto-zeroing circuit coupled across said comparator circuit,
    wherein the image sensor is operable such that the analog signal from the pixel and the reference signal from the time-varying reference circuit are constantly read onto respective ones of said two coupling capacitors during both the first calibration period and the second read period; and
    wherein said time-varying reference circuit is arranged to begin providing a ramping of said reference signal during said second read period and determine a change in magnitude of said analog signal between said first calibration period and said second read period, said time-varying reference circuit also arranged to provide said ramping of said reference signal during said first calibration period during a time period when said auto-zeroing circuit is actuated so as to compensate for any delay in onset of said ramping during said second read period.

13. An apparatus, comprising:
a pixel configured to generate an analog pixel signal;
a first capacitor configured to receive a ramp signal;
a second capacitor configured to receive the analog pixel signal, wherein the first and second capacitors are connected together at a node;
a first inverter having an input connected to said node;
a first switch configured to selectively connect an output of the first inverter to said node; and
wherein a first ramping in said ramp signal is applied to said first capacitor while said first switch is activated.

14. The apparatus of claim 13, wherein a termination of the first ramping in said ramp signal occurs after deactivation of said first switch.

15. The apparatus of claim 13, further comprising:
a second inverter having an input connected to said output of the first inverter;
a second switch configured to selectively connect an output of the second inverter to input of the second inverter;
wherein the first rise in said ramp signal is applied to said first capacitor while said first and second switches are both activated; and
wherein a second ramping in said ramp signal is applied to said first capacitor while said first switch is deactivated and said second switch is activated.

16. The apparatus of claim 15, further comprising a third capacitor coupled between the output of the first inverter and the input of the second inverter.

17. The apparatus of claim 15, wherein a third ramping in said ramp signal is applied to said first capacitor while said first and second switches are deactivated.

18. The apparatus of claim 15, wherein a termination of the first ramping in said ramp signal occurs after deactivation of said first switch.

19. The apparatus of claim 15, wherein a termination of the second ramping in said ramp signal occurs after deactivation of said second switch.

20. The apparatus of claim 13, wherein said first ramping in said ramp signal is a ramping starting from a nominal value at a point in time during activation of said first switch, said ramping terminating after said first switch is deactivated.

21. The apparatus of claim 15, wherein said second ramping in said ramp signal is a ramping starting from a nominal value at a point in time during activation of said second switch, said ramping terminating after said second switch is deactivated.

22. The apparatus of claim 21, wherein said first ramping in said ramp signal is a ramping starting from a nominal value at a point in time during activation of said first switch, said ramping terminating after said first switch is deactivated and before said second ramping starts.

23. The apparatus of claim 21, wherein an onset of ramping of the ramp signal from said nominal value begins at a same point in time before each of the first and second switches are deactivated.

24. The apparatus of claim 17, wherein said third ramping in said ramp signal is a ramping from a same nominal value as the first ramping and second ramping.

* * * * *